US012242335B2

United States Patent
Jain et al.

(10) Patent No.: US 12,242,335 B2
(45) Date of Patent: Mar. 4, 2025

(54) METHOD AND APPARATUS FOR FAULT AGGREGATION AND SUPPORT FOR VIRTUALIZATION

(71) Applicant: NXP B.V., Eindhoven (NL)

(72) Inventors: Aarul Jain, New Delhi (IN); Hemant Nautiyal, Greater Noida (IN); Ashu Gupta, Bangalore (IN)

(73) Assignee: NXP B.V., Eindhoven (NL)

( * ) Notice: Subject to any disclaimer, the term of this patent is extended or adjusted under 35 U.S.C. 154(b) by 78 days.

(21) Appl. No.: 18/335,189

(22) Filed: Jun. 15, 2023

(65) Prior Publication Data

US 2024/0354187 A1    Oct. 24, 2024

(30) Foreign Application Priority Data

Apr. 18, 2023  (IN) .............................. 202341028296

(51) Int. Cl.
*G06F 11/00* (2006.01)
*G06F 11/07* (2006.01)

(52) U.S. Cl.
CPC ...... *G06F 11/0793* (2013.01); *G06F 11/0721* (2013.01); *G06F 11/0736* (2013.01); *G06F 11/0772* (2013.01); *G06F 11/079* (2013.01)

(58) Field of Classification Search
CPC ............. G06F 11/0772; G06F 11/0778; G06F 11/0781; G06F 11/079; G06F 11/0793
See application file for complete search history.

(56) References Cited

U.S. PATENT DOCUMENTS

| 9,495,239 | B1 * | 11/2016 | Ahmad ............... G06F 11/0772 |
| 11,334,409 | B2 | 5/2022 | Nautiyal et al. |
| 2023/0214292 | A1 * | 7/2023 | Pandey ............... G06F 11/0781 |
| | | | 714/764 |

OTHER PUBLICATIONS

Using SPC56EL60x/RPC56EL60x fault collection and control unit, Sep. 2015, www.st.com (Year: 2015).*

* cited by examiner

*Primary Examiner* — Marc Duncan

(57) ABSTRACT

A fault indication from a fault source is to be provided to a demultiplexer which is configured to output the fault indication. The demultiplexer is configurable to output the fault indication to an OR gate of a plurality of OR gates coupled to a respective fault channel of a plurality of fault channels based on an application which uses the fault source as a resource. A reaction to the fault indication is performed based on the fault channel which received the fault indication.

20 Claims, 5 Drawing Sheets

| Application 402 | Fault Source 404 | Fault Channel 406 |
|---|---|---|
| Application 1 | Fault Source 1 | Fault Channel 3 |
| Application 2 | Fault Source 2 | Fault Channel 2 |
| Application 3 | Fault Source 3 | Fault Channel 1 |
| Application 4 | Fault Source 4 | Fault Channel 4 |
| Application 5 | Fault Source 5 | Fault Channel 2 |

400

METHOD AND APPARATUS FOR FAULT AGGREGATION AND SUPPORT FOR VIRTUALIZATION

CROSS-REFERENCE TO RELATED APPLICATIONS

This application claims the priority under 35 U.S.C. § 119 of India Patent application No. 202341028296, filed on 18 Apr. 2023, the contents of which are incorporated by reference herein.

FIELD OF USE

This disclosure generally relates to fault handing, and more particularly to fault aggregation and support for virtualization.

BACKGROUND

Increasing level of system integration has resulted in increased numbers of processing systems being integrated in a system on a chip (SoC). The processing systems facilitate execution of applications resulting in a possibility of faults being generated in the processing systems. To maintain reliable operation of the SoC, the fault need to be reacted to such as by performing a hardware or software reset of a processing system which generated the fault and/or generating an interrupt.

Figure 1:
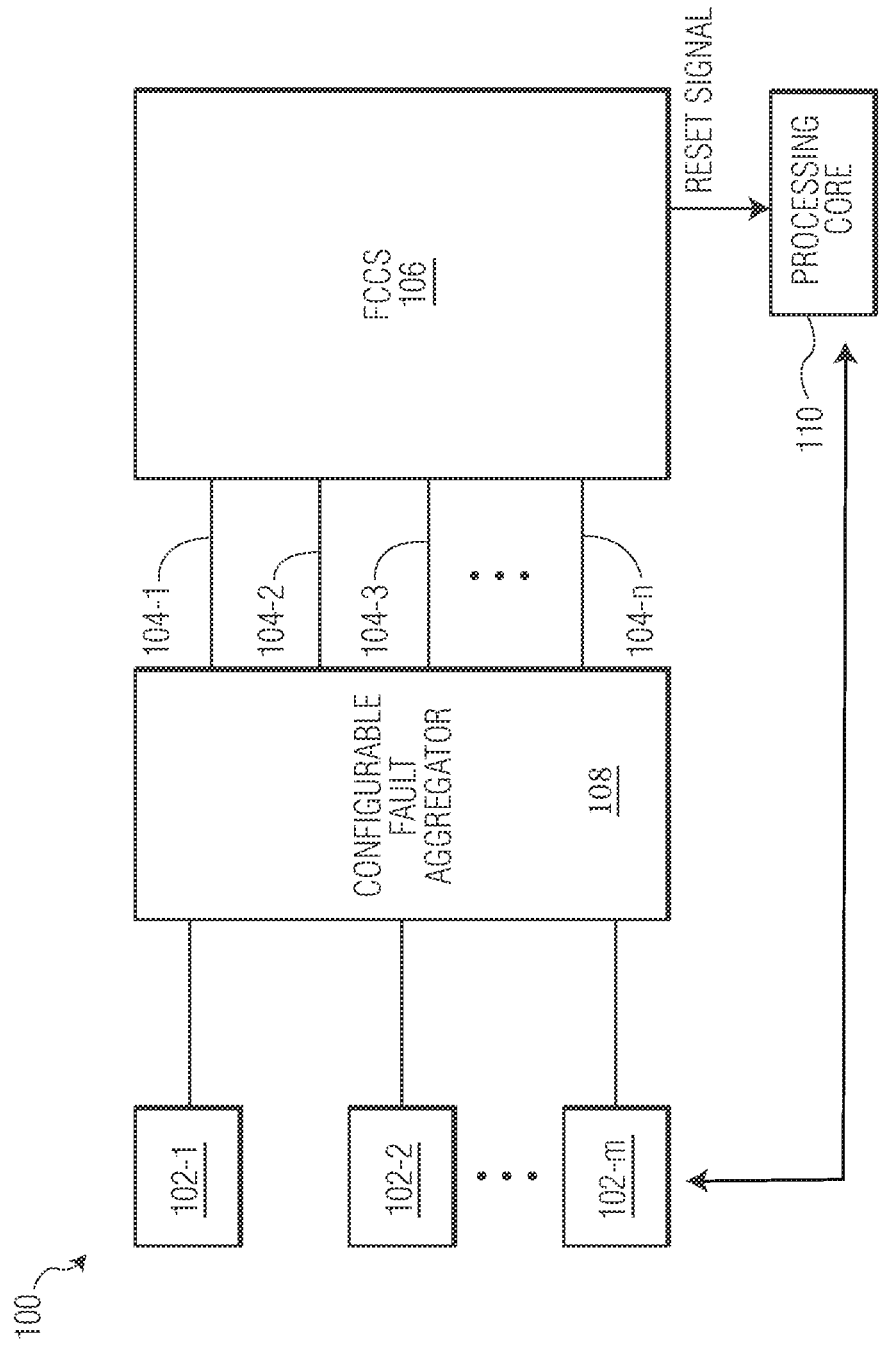
FIG. 1 illustrates an example block diagram of a system for propagating a fault indication from a fault source to a fault channel of a fault collection and control system (FCCS) in accordance with an embodiment.

The drawings are for the purpose of illustrating example embodiments, but it is understood that the embodiments are not limited to the arrangements and instrumentality shown in the drawings.

DETAILED DESCRIPTION

The detailed description of the appended drawings is intended as a description of the various embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

A fault collection and control system (FCCS) in a system-on-a-chip (SoC) collects an indication of a fault in a processing system of the SoC and performs a reaction to the fault in the processing system. The fault typically results from a processing core executing an application which causes a fault to be generated by a fault source, where an application uses the fault source as a resource. Each fault source is typically coupled to a respective fault channel of the FCCS. A reaction to a fault indication received on a fault channel is performed based on the received fault indication. Because a different reaction can be provided on each fault channel, a gate count and die size of the FCCS increases as a number of fault sources increase because each fault indication from the fault source is handled independently by the respective fault channel and a fault handling interface becomes more complex with the increased number of fault sources. To reduce a number of fault channels, several fault sources could be aggregated to a single fault channel by an OR gate. One or more fault sources are coupled to the OR gate and an output of the OR gate is coupled to a single fault channel of the FCCS. The tradeoff with this arrangement is that the reaction is the same for the aggregated fault sources on the single fault channel even if a different reaction might be preferred for one the fault sources because an application which use the one of the fault sources as a resource is different from an application which uses another fault source as a resource and different reactions are preferred for the two applications.

Embodiments disclosed herein are directed to an improved fault aggregation in an FCCS of a system on a chip (SoC). Each fault source is coupled by a fault gate to a demultiplexer and an output of the demultiplexer is further coupled to a respective OR gate which is coupled to a respective fault channel of the FCCS. The fault gate may be enabled or disabled to control which fault sources are able to provide fault indications to a respective demultiplexer. The demultiplexer is a 1×N demultiplexer (where N is an integer) which is programmable and configured to provide the fault indication from the fault source to any of the fault channels of the FCCS. In an example, the demultiplexer provides the fault indication to one of a plurality of fault channel of the FCCS associated with a fault handler configured to perform a reaction to a fault source which generated the fault indication on the fault channel. In an example, the demultiplexer is configurable so that the fault indication of a fault source is provided to a fault channel which will produce a specific reaction to the fault source based on the application which uses the fault source as a resource instead of conventionally aggregating the fault sources and providing a same reaction for the aggregated fault sources even if the reaction could vary depending on which application uses the fault source as a resource. Well known instructions, protocols, structures, and techniques have not been shown in detail in order not to obfuscate the description.

Example Systems

FIG. 1 illustrates an example block diagram of a system 100 for propagating a fault indication from a fault source 102 to a fault channel 104 of a fault collection and control system (FCCS) 106 in accordance with an embodiment. The system 100 may be embedded in an electronic system (not shown) such as an automotive system, an aircraft guidance system, a home security system, among other systems and implemented with circuitry such as one or more of analog circuitry, mix signal circuitry, memory circuitry, logic circuitry, and processing circuitry that executes code stored in a memory that when executed by the processing circuitry performs the disclosed functions, among other implementations, on a system on a chip (SoC).

The system may have a plurality of fault sources 102-1 to 102-m which may be coupled to a respective fault channel 104-1 to 104-n of the FCCS 106. In an example, a number of fault sources 102 may be M and a number of fault channels 104 may be N, where M>>N. In an example, a number of fault channels may correspond to a number of different reactions to be performed for faults in the system 100 as discussed in more detail below so that fault indications received on different fault channels result in specific reactions. The fault source may generate a fault indication in response to occurrence of a fault in the fault source. In an example, the fault source may be a resource of a software application executed on a processing core 110 which is used by the application to perform functions of the electronic system. The processing core and fault source may each be a central processing unit, processor, microprocessor, electronic control, clock monitor, watchdog circuit, direct memory access (DMA) circuit, memory, memory controller, input/output controller, accelerator and the like that manages events and/or performs computations associated with the application of the system 100. In an example, the fault may occur based on a failure of hardware resulting from execution of the application (e.g., execution environment). As an example, the resource/fault source may be a timer used by an application to count events and if there is a fault which prevents the timer to not count events, the timer may generate a fault indication and be a fault source. As another example, the resource/fault source may be a transmitter used by an application and the transmitter which has an error in a transmit path is a fault source. As yet another example, the resource/fault source may be a memory used by an application and when the memory has a fault detected by an error checking code the memory may generate a fault indication and be a fault source. The fault indication is one or more bits which may indicate presence or absence of a fault. Each fault channel may be configured to perform a certain reaction when a fault indication is received on the fault channel and different reactions may be performed by the different fault channels. The FCCS 106 may perform a reaction based on the fault indication and the reaction may be a reset signal provided to a processing core 110. In an example, the processing core 110 may be one or more processing core 110. In an example, the reaction may be a software reset of a processing core 110 which executes the application which uses the fault source as a resource. The software reset may terminate an application (e.g., software or execution environment) executing on the processing core 110 and clear any data in memory associated with the application which caused the fault. In another example, the reaction may be a hardware reset of the processing core 110. The hardware reset may clear the application and all configuration parameters of the application from the processing core 110 and boot the processing core 110 to reload the application and configuration parameters. Other reactions are also possible such as sending an interrupt signal to the processing core 110 to cause the processing core 110 to attempt to rectify the fault without performing a reset or sending a reset signal to a reset controller of the processing core 110 to cause the fault source to be hardware reset rather than the entire processing core 110. In some examples, the fault source may be integrated in the processing core 110.

Embodiments disclosed herein are directed to a configurable fault aggregator 108 which is communicatively coupled to the fault sources 102 and fault channels 104 of the FCCS 106. The fault indication that is received from a fault source may be provided to one of the fault channels, where in an example the fault channel that the fault indication is provided to is based on the application which uses the fault source as a resource. In an example, the outputs of each demultiplexer may be configured so that a fault indication is provided to a first fault channel based on a first application using the fault source as a resource and to a second fault channel based on a second application using the fault source as a resource. This way the fault indication may be provided to a fault channel which generates an appropriate reaction to the fault for the application which uses the fault source as a resource rather than generating a same fault reaction for the fault source regardless of the application which uses the fault source as a resource. Further, the configurable fault aggregator 108 allows for virtualization of fault handling by the FCCS 106 so that the fault handling is isolated to an application. In an example, the fault aggregator 108 may have one or more registers which indicate whether a fault source generated a fault indication and a configuration of the fault aggregator 108 which indicate to which fault channel a fault indication from a fault source is sent to. The one or more registers may be accessible to an application so long as the application uses the fault source as a resource.

Figure 2:
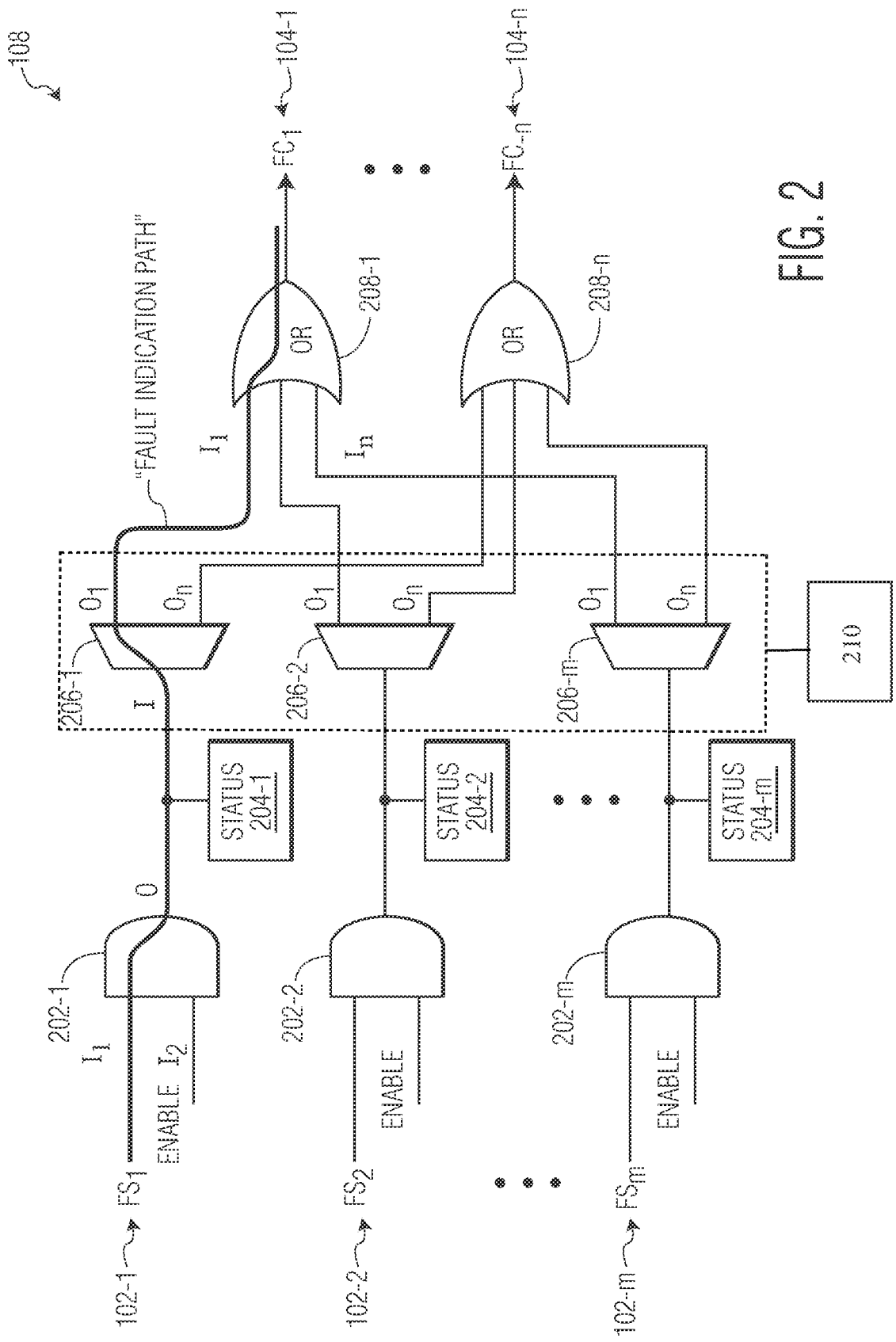
FIG. 2 illustrates example circuitry of a fault aggregator in accordance with an embodiment.

FIG. 2 illustrates example circuitry of the fault aggregator 108 in accordance with an embodiment. The fault aggregator 108 may be configurable to route each fault indication from each fault source 102 FS-1 to FS-m to any of the fault channels 104 FC-1 to FC-n of the FCCS 106. Each fault channel may be associated with a particular reaction to a fault indication received on the fault channel and as a result routing the fault indication to a particular fault channel allows for configuring the reaction based on the application which uses the fault source as a resource. In an example, a fault source is coupled to the fault aggregator 108 when configurability of a reaction to the fault source is needed. If the fault source is to be coupled to a same fault channel regardless of the application which uses the fault source as a resource, then the fault source may be directly coupled to the same fault channel and not via the fault aggregator 108. The fault aggregator 108 may also enable communication of a fault indication from a fault source which operates in one clock domain to a fault channel which operate in another clock domain. The fault source 102 may indicate the fault based on an edge or level trigger while the FCCS 106 uses a handshake to request a fault indication and acknowledge receipt of the fault indication over the fault channel 104. The fault aggregator 108 may facilitate communication of the fault indication from the fault source 102 to the FCCS 106 via the handshake.

The fault aggregator 108 may have a fault indicator gate 202-1 to 202-$m$, a demultiplexer 206-1 to 206-$m$, and OR gate 208-1 to 208-$n$. The fault gate 202 may have two inputs $I_1$, $I_2$ and an output O. A first input $I_1$ may be coupled to a fault source and receive a fault indication from a fault source. A second input $I_2$ may be an enable input which when asserted allows the fault indication on the first input to be provided to the output of a fault gate and if not asserted prevents the fault indication on the first input from being provided to the output of a fault gate. An enable input may be programmed by the FCCS 106 for a fault source to cause a fault indication from a fault source to be provided to a demultiplexer during a configuration of the fault aggregator 108. A demultiplexer may have one input I and N outputs $O_1$ to $O_n$ where N is an integer and a number of fault sources M is at least greater than N and typically substantially greater than N. The input of a demultiplexer may be coupled to a fault gate. An OR gate which performs a logic OR function may have a plurality of inputs $I_1$ to $I_n$ coupled to respective outputs of a demultiplexer and an output of the OR gate which is coupled to a fault channel of the FCCS 106.

The demultiplexer 206 may be configured to communicate a fault indication from a fault source to a fault channel.

This communication is illustrated for fault source 102-1 which generates a fault indication to be communicated to fault channel 104-1 in a "fault indication path". In an example, a fault source 102-1 may receive a fault indication. The fault indicator gate 202-1 may be configured based on the assertion of the enable signal to provide the fault indication to the output of the fault indicator gate 202-1. The fault indication may be received by the demultiplexer 206-1. Based on a configuration of the demultiplexer 206-1, the fault indication may be output to an OR gate 208-1 associated with a fault channel 104-1 of the FCCS 106. The OR gate 208-1 may perform a logic OR function based on a fault indication received from any of the demultiplexers. For example, the fault indication may be a binary value in an example, where "1" indicates presence of a fault and "0" does not indicate presence of a fault. If any of the demultiplexers coupled to an OR gate output a logic "1", then the OR gate will provide a logic "1" to a fault channel to cause the reaction associated with the fault channel to be performed. The reaction may be performed for the fault sources which is able to provide a fault indication to the fault channel based on a configuration of the demultiplexers. The fault indication received at different fault channels may result in a different fault reactions. In an example, the fault aggregator 108 may have a demultiplexer configuration register 210 which indicates for each demultiplexer which of the outputs the input of the demultiplexer is provided to. The demultiplexer configuration register 210 may be configured during a boot up or initialization process of the FCCS 106 and/or dynamically during operation of the FCCS 106 and facilitate configuration of the demultiplexer to route a fault indication from a fault source to an OR gate coupled to a particular fault channel associated with a particular reaction. The configuration of the demultiplexer may be based on which application uses the fault source as a resource so that a particular reaction is performed for the fault source which provides the fault indication based on the application which uses the fault source as a resource when the fault indication is received by the particular fault channel. If the fault indication is output to the aggregator 208-1 from the fault source 102-1 which a particular application uses as a resource, then the demultiplexer 206-1 may be arranged to output the fault indication to the output $O_1$ of the demultiplexer 206-1 and to the fault channel 104-1. A reaction associated with the fault channel may be performed when the fault indication is received at the fault channel 104-1.

The fault aggregator 108 may have a plurality of status registers 204. A status register 204-1 coupled to the output of the fault indicator gate 202-1 may store an indication of whether the fault indication was received from the fault source 102-1 such that the reaction associated with the fault channel 104-1 is performed for the fault source 102-1 when the fault status register 204-1 indicates the fault indication.

Figure 3:
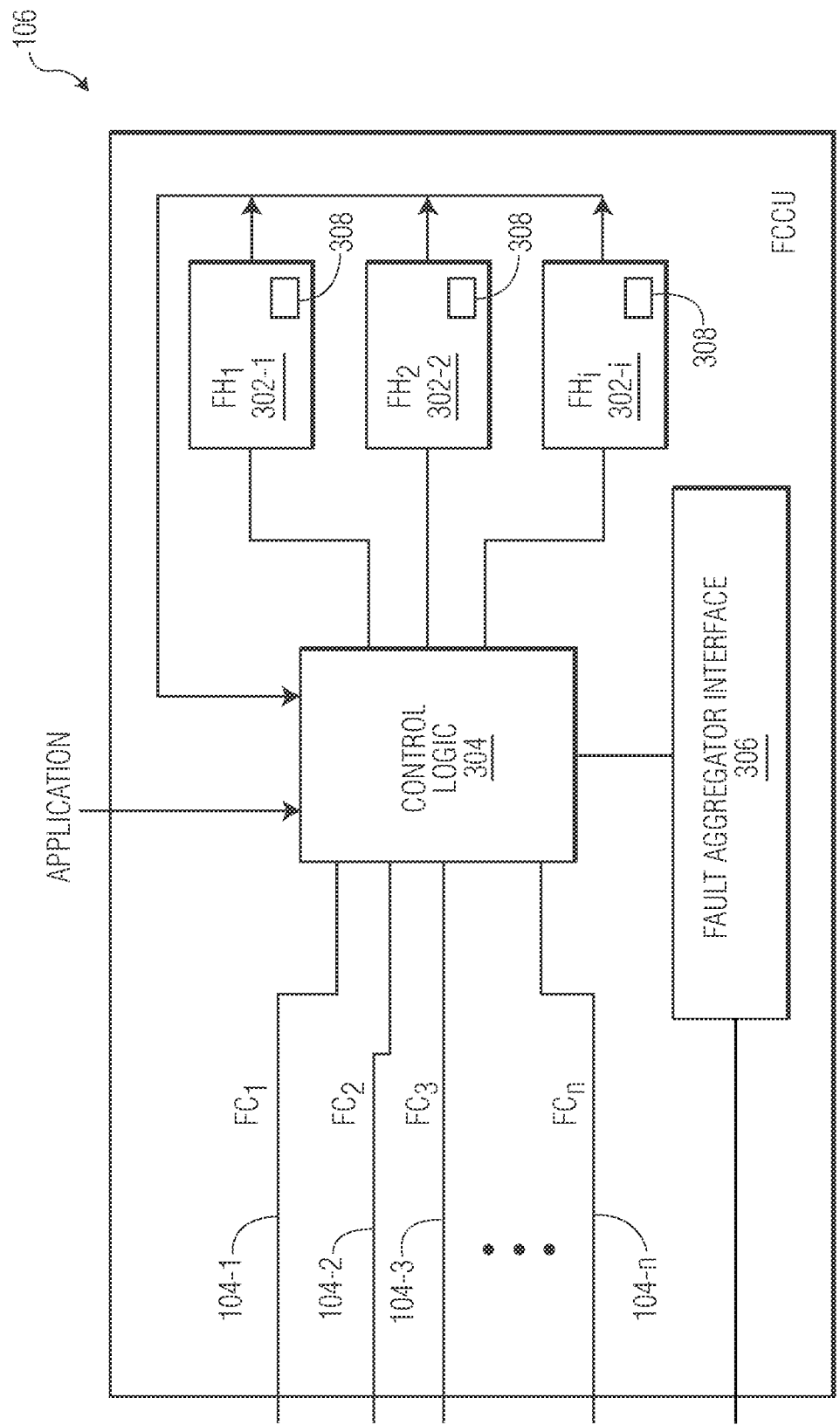
FIG. 3 illustrates example circuitry of the FCCS in accordance with an embodiment.

FIG. 3 illustrates example circuitry of the FCCS 106 in accordance with an embodiment. The FCCS 106 may have a fault aggregator interface 306, control logic 304, and a plurality of fault handlers 302-1 to 302-i. The fault aggregator interface 306 may facilitate access to the status registers and the demultiplexer configuration register 210. In an example, the fault aggregator interface 306 may allow the FCCS 106 to read from or write to the status register 204 to determine whether a fault indication is generated by a fault source. A status register may be set to a fault indication when the fault source generates the fault indication and not set to the fault indication (e.g., clear the status register of the fault indication) when the fault source does not generate or stops generating the fault indication. Additionally, the fault aggregator interface 306 may allow the FCCS 106 to read from the demultiplexer configuration register 210 to determine to which fault channel a fault indication from a fault source is communicated to and write to the demultiplexer configuration register 210 to configure the demultiplexers 206. Based on writing to the demultiplexer configuration register 210, the FCCS 106 may be able to configure a demultiplexer to provide a fault indication from a particular fault source to a particular fault channel so that a particular reaction associated with the fault channel is performed when a fault indication is received from the particular fault source. In an example, which application may use the particular fault source as a resource may determine the particular fault channel that a fault indication from the particular fault source is received and the configuration of the demultiplexer.

The control logic 304 may receive a fault indication from a fault channel and signal a fault handler of the fault channel to perform a fault reaction for the fault indication. The fault channel may be arranged to receive the fault indication from a fault source based on a configuration of a demultiplexer indicated by demultiplexer configuration register 206 and assertion of an enable signal at a fault gate of the fault source. The fault handler may then perform a reaction for the fault indication received over the fault channel.

In an example, a fault handler may be associated with a fault channel such as fault handler (FH1) 302-1 handling a fault indication from fault channel 104-1 and fault handler (FH2) 302-2 handling a fault indication from fault channel 104-2 etc. A fault handler may perform a corresponding reaction for the fault channels coupled to a fault source such that a first fault handler coupled to a first set of fault channels may perform a first reaction and a second fault handler coupled to a second set of fault channels may perform a second reaction different from the first reaction. The fault reaction may be indicated by a fault handling register 308 of a respective fault handler. The fault reaction may include a local reaction signal to the processing core 110 such as a reset or interrupt of the fault source or a global reaction which might generate a signal external to the processing core 110, fault aggregator 108, and/or FCCS 106 such an interrupt signal to the electronic system in which the system 100 is located. In an example, each fault handler may generate a corresponding reaction to a particular processing core 110 and a number fault handlers may correspond to a number of processing cores 110 in the system 100.

The control logic 304 may also receive a command from an application that executes in the electronic system. The command may be to clear a status register for a fault source after a fault reaction is performed and the fault is no longer present for the fault source. Further, the control logic 304 may receive a command from an application to read a status register of a fault source and provide a fault indication for a fault source to an application. The FCCS 106 may provide a virtual environment to the application. In the virtual environment, the application is able to only access a fault indication for certain fault sources which the application uses as resources thereby isolating access to the application to the fault indications of the certain fault sources. If the application does not use a fault source as a resource, then the control logic 304 might not provide the fault indication of the fault source to the application. If the application uses a fault source as a resource, then the control logic 304 provides the fault indication of the fault source to the application. If the application signals to clear a fault indication for a fault source, the control logic 304 may determine if the application uses the fault source as a resource. If the application uses a fault source as a resource, then the control logic 306 may signal a fault handler for a fault channel to clear a status register of the fault source. If the application does not use a fault source as a resource, then the control logic 306 might not signal a fault handler for a fault channel to clear a status register of the fault source. In an example, the FCCS 106 may store an indication of each application and which fault source the application uses as a resource. The controlled access to a status register allows for isolating a fault source to a virtual environment associated with the application.

The fault aggregator 108 is shown to be separate from the FCCS 106. In some examples, the fault aggregator 108 may be integrated in the FCCS 106.

Figure 4:
FIG. 4 illustrates an example table used for configuring a demultiplexer of the fault aggregator in accordance with an embodiment.

FIG. 4 illustrates an example table 400 used for configuring a demultiplexer of the fault aggregator in accordance with an embodiment. The table 400 may be stored in a memory and accessible to the FCCS 106 in an example to configure the demultiplexer configuration register 210 via the fault aggregator interface 306. The configuration may allow a demultiplexer to provide a fault indication from a fault source which is a resource of an application to a particular fault channel that results in a desired reaction when the application is using the fault source as a resource.

The table 400 may have a plurality of columns 402 to 406. Column 402 may identify an application, column 404 may identify a fault source, and column 406 may identify a fault channel. A particular row may indicate the fault source and fault channel both associated with an application where the fault channel produces a reaction when a fault indication is received from the fault source on this fault channel. As an example, application 1 may use fault source 1 as a resource and any fault indication from this fault source (received via a demultiplexer and fault aggregator) is provided to fault channel 3. As another example, application 2 may use fault source 2 as a resource and any fault indication from this fault source (received via a demultiplexer and fault aggregator) is provided to fault channel 2. The table 400 illustrates arrangement of fault sources and fault channels for other applications as well and in an example a number of fault sources may be greater than a number of fault channels resulting in a need for the fault aggregation where fault indications of multiple fault sources might be provided to a same fault channel (e.g., fault source 2 and 5 may provide respective fault indications to fault channel 2). The corresponding fault channel which receives a fault indication provides a specific reaction and different fault channels may be associated with different reactions. The FCCS 106 may use this table to configure a demultiplexer so that a fault source associated with a fault source which is a resource of an application provides its fault indication to the fault channel which will generate a particular reaction for the application. In an example, the FCCS 106 may access the table 400 to determine the fault source associated with an application to provide virtualization and isolation of the fault sources to the application.

Example Methods

Figure 5:
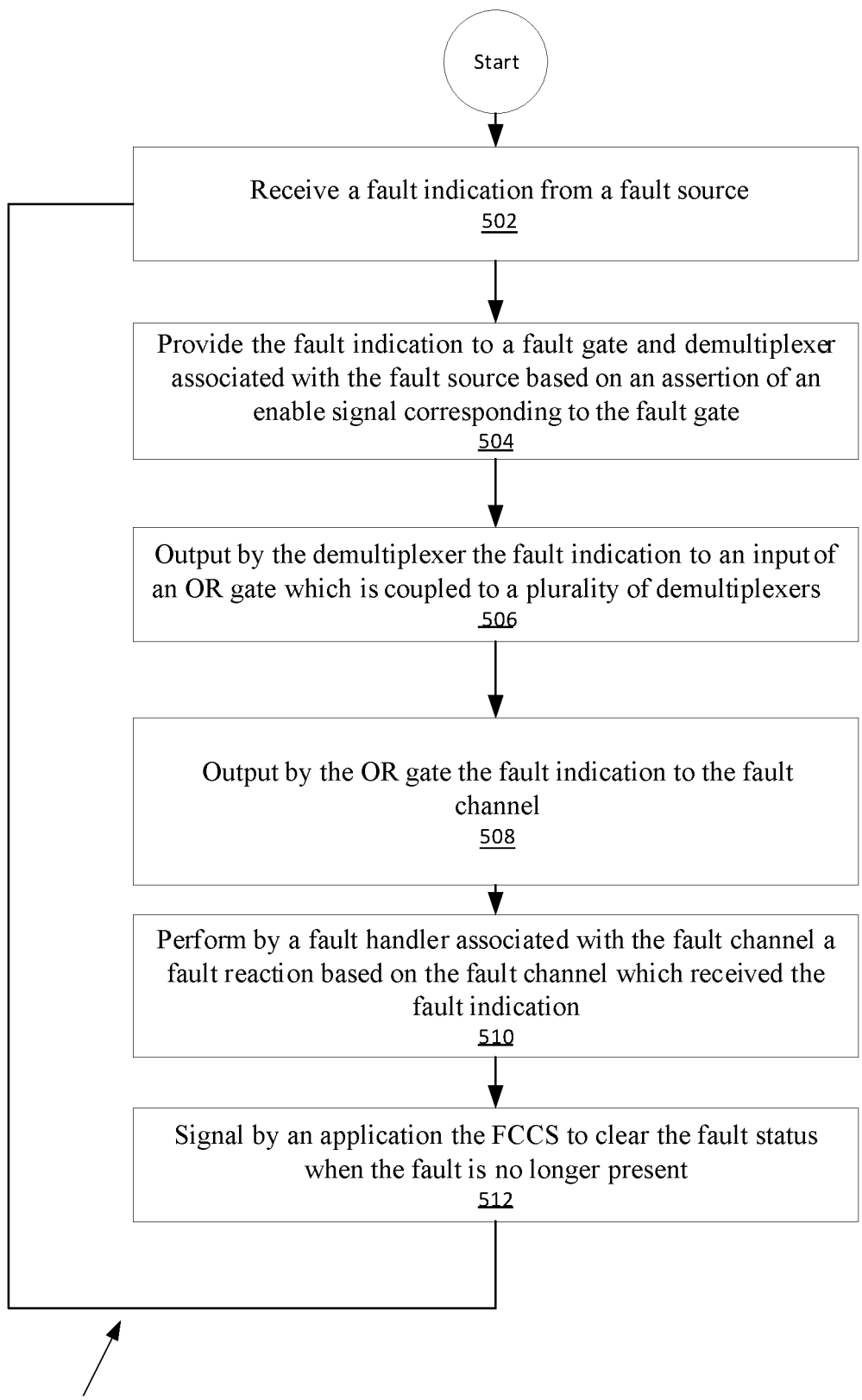
FIG. 5 is a flow chart of functions associated with fault aggregation in accordance with an embodiment.

FIG. 5 is a flow chart 500 of functions associated with fault aggregation in accordance with an embodiment. The functions 500 may be performed by one or more of the configurable fault aggregator 108 and FCCS 106 in an example. Further, the demultiplexer configuration register 210 may be configured to indicate for each demultiplexer which of the outputs the input of the demultiplexer is provided to prior to performing the functions of the flow chart 500 in an example. Further, as part of a configuration process (e.g., boot up or initialization process of the FCCS 106), enable signals may be asserted for those fault sources which are used as a resource so that fault indications corresponding to the fault sources may be provided to respective demultiplexers.

At 502, a fault indication from a fault source is received. At 504, the fault indication is provided to a fault gate and demultiplexer associated with the fault source based on an assertion of an enable signal corresponding to the fault gate. The demultiplexer may be configured to output the fault indication from the fault source and not any other fault sources also coupled to the input of the demultiplexer. The fault indication may be a logic "1" in an example. At 506, the demultiplexer outputs the fault indication to an input of an OR gate which is coupled to a plurality of demultiplexers. The demultiplexer may be configured to route the fault indication from the fault source to the OR gate coupled to a fault channel. In an example, the OR gate and fault channel which the fault indication is routed by the demultiplexer to may be based on which application uses the fault source as a resource. For example, if a first application uses the fault source as a resource, then the demultiplexer may be configured to output the fault indication on the fault source to a first OR gate and first fault channel which generates a first reaction to the fault indication. If a second application uses the fault source as a resource, the demultiplexer may be configured to output the fault indication on the fault source to a second OR gate and second fault channel which generates a second reaction to the fault indication which is different from the first reaction. In other examples, a severity of a fault in a fault source or some other criteria may be used to determine to which fault channel the fault indication of the fault source may be routed. At 508, the OR gate will output the fault indication to the fault channel. At 510, a fault handler associated with the fault channel performs a fault reaction based on fault indication received at the fault channel. The fault reaction may be performed for the fault source coupled to the fault channel with a status register indicating the fault indication. The fault handler associated with the fault channel may perform the reaction which may be a reset of the fault source in an example. At 512, an application for which the fault source is a resource signals the FCCS to clear the fault status in the status register of the fault source when the fault is no longer present. The FCCS provides a virtualization of the fault status to the application and isolates the fault source to the application. Processing returns back to step 502.

In an embodiment, a method is disclosed. The method comprises: causing a fault indication from a fault source to be provided to a demultiplexer; receiving, by the demultiplexer, the fault indication from the fault source; outputting, by the demultiplexer, the fault indication to an input of an OR gate of a plurality of OR gates, the OR gate coupled to a respective fault channel of a plurality of fault channels of a fault collection and control system (FCCS), wherein the demultiplexer is configurable to output the fault indication to the fault channel via the OR gate of the plurality of OR gates based on an application which uses the fault source as a resource; receiving, by the OR gate, from the demultiplexer the fault indication; outputting, by the OR gate, the fault indication to the fault channel coupled to an output of the OR gate; and performing, by a fault handler of the FCCS, a reaction to the fault indication based on the fault channel which received the fault indication. In an example, the method further comprises asserting an enable signal at a fault gate of the fault source based on the fault source being used as the resource to cause the fault indication to be provided to the demultiplexer. In an example, the method further comprises the control logic reading a demultiplexer configuration register to determine a configuration of the demultiplexer or writing to the demultiplexer configuration register to cause the fault indication from the fault source to be provided to the fault channel. In an example, the method further comprises storing the fault indication output by the fault gate in a status register coupled to the fault source. In an example, the control logic of the FCCS signals a fault handler associated with the fault channel to clear a status register based on a signal from the application, the status register indicative of the fault being asserted. In an example, the control logic provides the fault indication in the status register to the application based on a signal from the application, the status register indicative of the fault being asserted. In an example, control logic of the FCCS does not signal the fault handler associated with the fault channel to clear the status register based on a signal from another application to isolate the fault source to the application. In an example, a number of fault sources is greater than a number of fault channels. In an example, the reaction is a reset signal to a processing core which executes the application. In an example, the reset signal is a software or hardware reset of the fault source. In an example, each fault channel is associated with a different reaction. In an example, the method further comprises reconfiguring the demultiplexer to provide the fault indication from the fault source to another fault channel which provides another reaction of a set of different reactions based on one or more of another application using the fault source as a resource or a severity of a fault of the fault source.

In another embodiment, a system is disclosed. The system comprises a fault collection and control system (FCCS) having a plurality of fault channels and a fault handler, a fault aggregator having a fault gate, a demultiplexer, and a plurality of OR gates, wherein the fault aggregator is arranged to cause a fault indication from a fault source to be provided to a demultiplexer; the demultiplexer is arranged to receive the fault indication from the fault source and output the fault indication to an input of an OR gate of the plurality of OR gates, wherein the demultiplexer is configurable to output the fault indication to the fault channel via the OR gate of the plurality of OR gates based on an application which uses the fault source as a resource; and the OR gate is arranged to receive from the demultiplexer the fault indication and output the fault indication to the fault channel coupled to an output of the OR gate; and the FCCS is arranged to perform a reaction to the fault indication based on the fault channel which received the fault indication. In an example, an enable signal is asserted at a fault gate of the fault source based on the fault source being used as the resource to cause the fault indication to be provided to the demultiplexer. In an example, the FCCS further comprises control logic arranged to read a demultiplexer configuration register to determine a configuration of the demultiplexer or write to the demultiplexer configuration register to cause the fault indication from the fault source to be provided to the fault channel. In an example, the control logic further comprises a fault handler associated with the fault channel to clear the status register based on a signal from the application, the status register indicative of the fault being asserted. In an example, the control logic is arranged to cause the fault handler to provide the fault indication in the status register to the application based on a signal from the application. In an example, the control logic is not arranged to cause the fault handler to provide the fault indication in the status register to another application based on a signal from the other application to isolate the fault source to the application. In an example, a number of fault sources is greater than a number of fault channels. In an example, the demultiplexer is reconfigured to provide the fault indication from the fault source to another fault channel which provides another reaction of a set of different reactions based on one or more of another application using the fault source as a resource or a severity of a fault of the fault source.

A few implementations have been described in detail above, and various modifications are possible. The disclosed subject matter, including the functional operations described in this specification, can be implemented in electronic circuit, computer hardware, firmware, software, or in combinations of them, such as the structural means disclosed in this specification and structural equivalents thereof: including potentially a program operable to cause one or more data processing apparatus such as a processor to perform the operations described (such as a program encoded in a non-transitory computer-readable medium, which can be a memory device, a storage device, a machine-readable storage substrate, or other physical, machine readable medium, or a combination of one or more of them).

While this specification contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Other implementations fall within the scope of the following claims.

We claim:

1. A method comprising:
    causing a fault indication from a fault source to be provided to a demultiplexer;
    receiving, by the demultiplexer, the fault indication from the fault source;
    outputting, by the demultiplexer, the fault indication to an input of an OR gate of a plurality of OR gates, the OR gate coupled to a respective fault channel of a plurality of fault channels of a fault collection and control system (FCCS), wherein the demultiplexer is configurable to output the fault indication to the fault channel via the OR gate of the plurality of OR gates based on an application which uses the fault source as a resource;

receiving, by the OR gate, from the demultiplexer the fault indication;

outputting, by the OR gate, the fault indication to the fault channel coupled to an output of the OR gate; and performing, by a fault handler of the FCCS, a reaction to the fault indication based on the fault channel which received the fault indication.

2. The method of claim 1, further comprising asserting an enable signal at a fault gate of the fault source based on the fault source being used as the resource to cause the fault indication to be provided to the demultiplexer.

3. The method of claim 1, further comprising the control logic reading a demultiplexer configuration register to determine a configuration of the demultiplexer or writing to the demultiplexer configuration register to cause the fault indication from the fault source to be provided to the fault channel.

4. The method of claim 1, further comprising storing the fault indication output by the fault gate in a status register coupled to the fault source.

5. The method of claim 1, wherein control logic of the FCCS signals a fault handler associated with the fault channel to clear a status register based on a signal from the application, the status register indicative of the fault being asserted.

6. The method of claim 5, wherein control logic provides the fault indication in the status register to the application based on a signal from the application, the status register indicative of the fault being asserted.

7. The method of claim 6, wherein control logic of the FCCS does not signal the fault handler associated with the fault channel to clear the status register based on a signal from another application to isolate the fault source to the application.

8. The method of claim 1, wherein a number of fault sources is greater than a number of fault channels.

9. The method of claim 1, wherein the reaction is a reset signal to a processing core which executes the application.

10. The method of claim 9, wherein the reset signal is a software or hardware reset of the fault source.

11. The method of claim 1, wherein each fault channel is associated with a different reaction.

12. The method of claim 1, further comprising reconfiguring the demultiplexer to provide the fault indication from the fault source to another fault channel which provides another reaction of a set of different reactions based on one or more of another application using the fault source as a resource or a severity of a fault of the fault source.

13. A system comprising:
a fault collection and control system (FCCS) having a plurality of fault channels and a fault handler,
a fault aggregator having a fault gate, a demultiplexer, and a plurality of OR gates, wherein the fault aggregator is arranged to cause a fault indication from a fault source to be provided to a demultiplexer; the demultiplexer is arranged to receive the fault indication from the fault source and output the fault indication to an input of an OR gate of the plurality of OR gates, wherein the demultiplexer is configurable to output the fault indication to the fault channel via the OR gate of the plurality of OR gates based on an application which uses the fault source as a resource; and the OR gate is arranged to receive from the demultiplexer the fault indication and output the fault indication to the fault channel coupled to an output of the OR gate; and
the FCCS is arranged to perform a reaction to the fault indication based on the fault channel which received the fault indication.

14. The system of claim 13, wherein an enable signal is asserted at a fault gate of the fault source based on the fault source being used as the resource to cause the fault indication to be provided to the demultiplexer.

15. The system of claim 13, wherein the FCCS further comprises control logic arranged to read a demultiplexer configuration register to determine a configuration of the demultiplexer or write to the demultiplexer configuration register to cause the fault indication from the fault source to be provided to the fault channel.

16. The system of claim 15, wherein the control logic further comprises a fault handler associated with the fault channel to clear the status register based on a signal from the application, the status register indicative of the fault being asserted.

17. The system of claim 15, wherein the control logic is arranged to cause the fault handler to provide the fault indication in the status register to the application based on a signal from the application.

18. The system of claim 17, wherein the control logic is not arranged to cause the fault handler to provide the fault indication in the status register to another application based on a signal from the other application to isolate the fault source to the application.

19. The system of claim 13, wherein a number of fault sources is greater than a number of fault channels.

20. The system of claim 13, wherein the demultiplexer is reconfigured to provide the fault indication from the fault source to another fault channel which provides another reaction of a set of different reactions based on one or more of another application using the fault source as a resource or a severity of a fault of the fault source.

* * * * *